Figure 1:
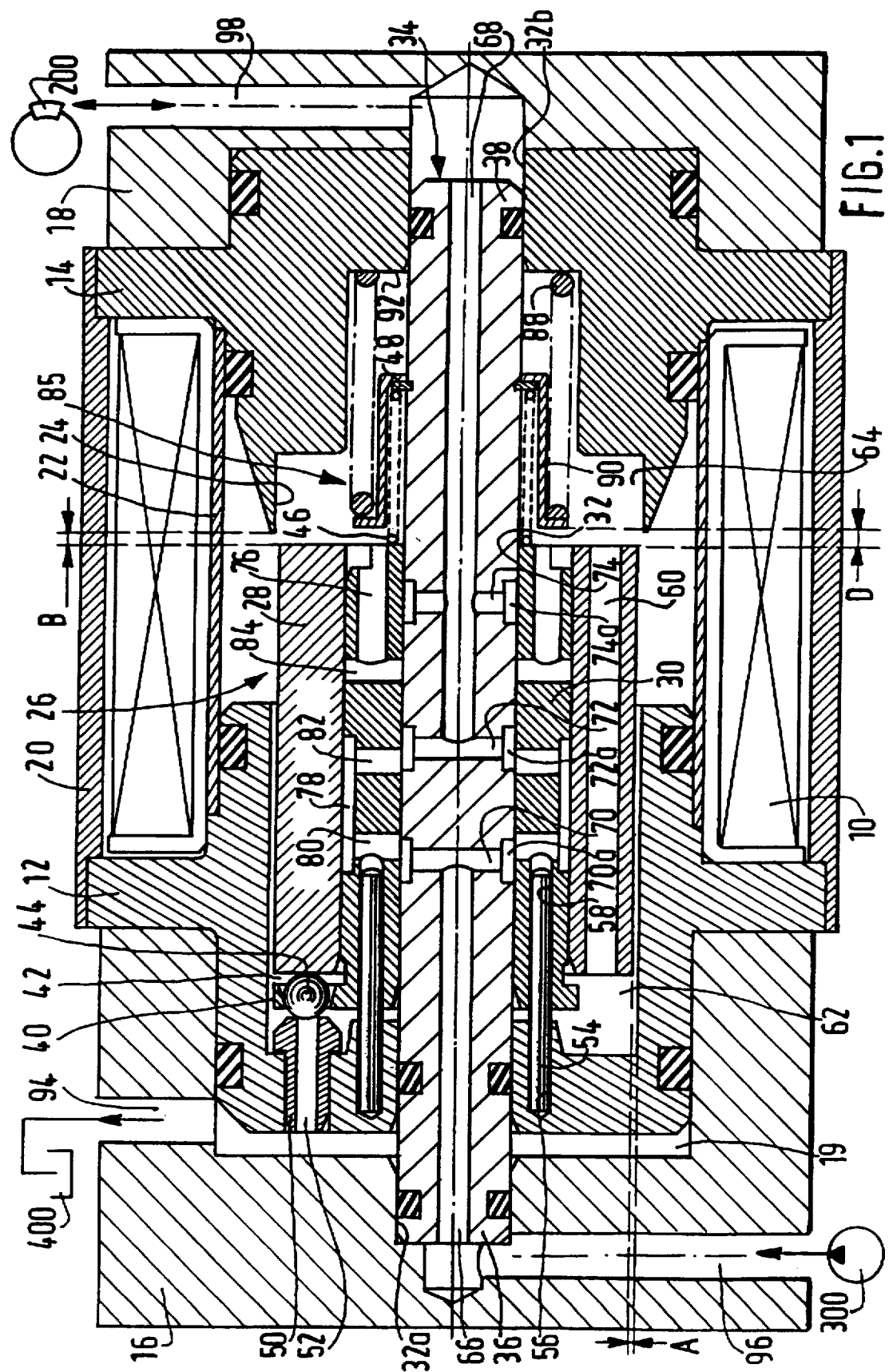

United States Patent [19]

Kervagoret et al.

[11] Patent Number: 5,765,930
[45] Date of Patent: Jun. 16, 1998

[54] PRESSURE-REGULATING SOLENOID VALVE FOR HYDRAULIC CIRCUIT

[75] Inventors: Gilbert Kervagoret, Argenteuil; Jean Marc Cheron, Longperrier; Philippe Bourlon, Aubervilliers, all of France

[73] Assignee: Bosch System De Freinage, Drancy, France

[21] Appl. No.: 507,360

[22] PCT Filed: Aug. 17, 1995

[86] PCT No.: PCT/FR95/01087

§ 371 Date: Aug. 23, 1995

§ 102(e) Date: Aug. 23, 1995

[87] PCT Pub. No.: WO96/07570

PCT Pub. Date: Mar. 14, 1996

[30] Foreign Application Priority Data

Sep. 8, 1994 [FR] France .................. 94 10730

[51] Int. Cl.$^6$ ........................... B60T 8/36
[52] U.S. Cl. .............. 303/119.2; 137/625.65; 251/129.21; 303/115.2
[58] Field of Search ............ 303/119.2, 115.2; 137/625.85; 251/129.07, 129.21

[56] References Cited

U.S. PATENT DOCUMENTS

| | | | |
|---|---|---|---|
| 4,619,289 | 10/1986 | Tsuru et al. | 303/119.2 |
| 4,714,300 | 12/1987 | Heess et al. | 303/115.2 |
| 5,005,919 | 4/1991 | Shuey et al. | 303/119.2 |
| 5,445,189 | 8/1995 | Yamamuro | 303/119.2 |

FOREIGN PATENT DOCUMENTS 0209817  7/1986  European Pat. Off. ....... 303/119.2

Primary Examiner—Matthew C. Graham
Attorney, Agent, or Firm—Leo H. McCormick, Jr.; Warren Comstock

[57] ABSTRACT

A pressure-regulating solenoid valve (100) for a hydraulic circuit for a braking system of a motor vehicle having wheel antilock structure. The hydraulic circuit has at least one pressurized fluid generator (300) connected to a pressure receiver (200) and to a reservoir (400) for retaining fluid at a low pressure. The solenoid valve (100) has an electrical coil (10) which interacts with two pole pieces (12,14), a sleeve structure (28,30) forming a magnetic body (26) which moves under the effect of an actuation force (O) generated by a magnetic field created by the electrical coil (10) and a distributor element (34). The distributor element (34) interacts with the sleeve structure (28,30) in order to command communication between a duct (98) connected to the pressure receiver (200) and a duct (94) connected to the reservoir (400) or a duct (96) connected to the pressure receiver (200). The solenoid valve (100) has at least one reaction chamber (80) which is permanently in communication with pressure chamber (200). The solenoid valve (100) reacts to a reaction force which is added to an actuation force (O) generated by the coil (10) and counter to a force (F) generated by a preloaded elastic means (46.85) on the movable body (26).

20 Claims, 2 Drawing Sheets

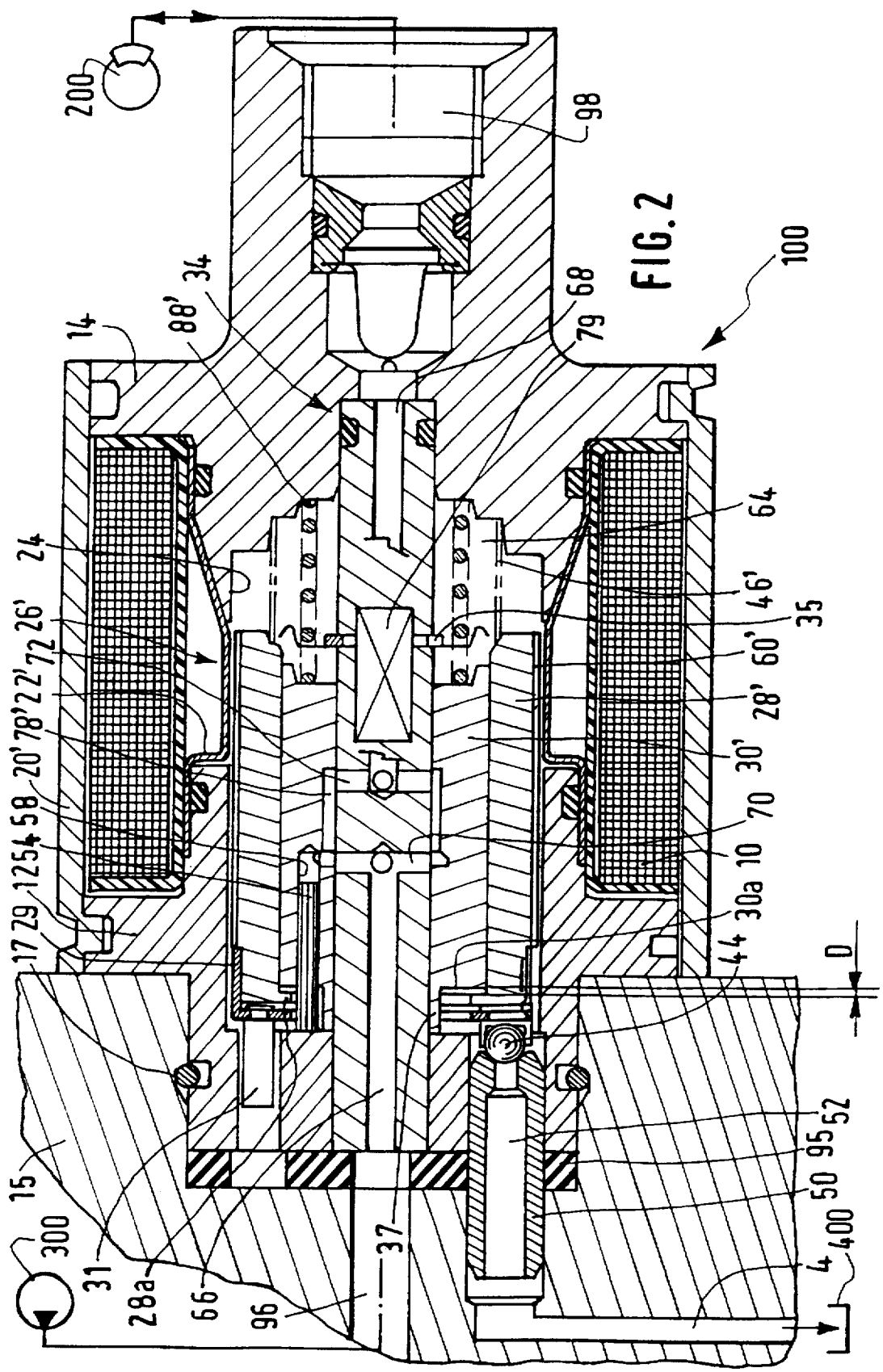

PRESSURE-REGULATING SOLENOID VALVE FOR HYDRAULIC CIRCUIT

The present invention relates to pressure-regulating solenoid valves for hydraulic circuits, more particularly but not exclusively to solenoid valves intended for the braking circuits of motor vehicles, provided with an antilock braking system.

Current antilock braking systems employ, between a source of pressurized fluid and a pressure receiver such as a brake motor, a solenoid valve commanded by a computer on the basis of signals representing the speed of rotation of the wheels in order, in general, to relieve the pressure of the fluid in the brake motor when the computer detects imminent locking of the wheel associated with this brake motor, then to connect a second source of pressurized fluid in order to increase the hydraulic pressure in the brake motor again until imminent locking is detected again, the pressure relief and raising cycle then recommencing.

The solenoid valves used operate most of the time in all-or-nothing mode, one solenoid valve being used to relieve the pressure in the brake motor, and another to make the pressure in this brake motor rise again, this being for each wheel of the vehicle.

These successive phases of relieving the pressure and making it rise again each last for a very short period of time and follow on rapidly from one another, which results in the solenoid valves changing state rapidly many times. This gives rise to significant noise due to the beating of the movable part of these solenoid valves, accompanied by abrupt changes in pressure in the brake motors, giving rise to transient ill-controlled conditions.

In order to avoid these drawbacks, it has since been proposed, for example in the documents FR-A-2,679,299 or FR-A-2,683,338, to use three-way solenoid valves of the proportional type. They allow, on the one hand, use of just one solenoid valve per wheel of the vehicle to be commanded, and, on the other hand, they operate much more quietly.

Such proportional solenoid valves nevertheless still have the drawback of exhibiting a significant overall size. Indeed, these solenoid valves most of the time are made up of a purely electrical part including the electrical coil, the pole pieces and a movable magnetic core, and a purely hydraulic part including a distributor slide valve sliding in a bore or a sleeve formed in a body including various hydraulic ducts, the connection between these two parts being effected by a push rod integral with the movable magnetic core on which the distributor slide valve comes to bear.

Such an in-line arrangement of the electrical and hydraulic parts gives known solenoid valves longitudinal dimensions which may make it difficult, or even impossible, to install them in the event of the space given over to them being too limited.

The object of the present invention is therefore to propose a pressure-regulating solenoid valve which exhibits a reduced overall size, and this being without increasing either the difficulties of manufacture or consequently the cost, and the operation of which is reliable under all circumstances.

To this end, the invention proposes a pressure-regulating solenoid valve for a hydraulic circuit comprising at least one generator of pressurized fluid, a pressure receiver and a reservoir of fluid under low pressure, the solenoid valve including an electrical coil interacting with two pole pieces, a magnetic body which can move under the effect of an actuating force generated by a magnetic field created by the electrical coil, and a distributor element interacting with a sleeve structure in order to command the communication between a duct connected to the pressure receiver and one or other of ducts connected to the generator of pressurized fluid, and to the reservoir of fluid under low pressure, the solenoid valve including at least one reaction chamber permanently communicating with the pressure receiver and determining a reaction force which is added to the actuating force generated by the coil, counter to the force generated by a preloaded elastic means on the movable magnetic body.

According to the present invention, the sleeve structure is made up by the movable magnetic body.

The invention will be better understood, and other objects, characteristics and advantages of it will emerge more clearly from reading the description which follows of a preferred embodiment, given by way of non-limiting example and with reference to the appended drawings in which:

FIG. 1 diagrammatically represents, in section, one embodiment of a solenoid valve in accordance with the present invention, and FIG. 2 diagrammatically represents, in section, an alternative embodiment to the solenoid valve of FIG. 1.

The solenoid valve represented in FIG. 1, and denoted overall by the reference 100, is intended to be inserted in a hydraulic circuit in order to modulate the pressure in a pressure receiver 200, by connecting the latter either to a generator 300 of pressurized fluid, or to a reservoir 400 of fluid under low pressure, under the command of a computer or of a microprocessor (which are not represented).

The solenoid valve 100 includes an electrical coil 10 capable of causing a magnetic flux to flow in two pole pieces 12 and 14 held between two end flanges 16 and 18 respectively with interposition of seals between each pole piece and the associated flange, a space 19 being formed axially between the pole piece 12 and the flange 16. The coil 10 is situated in a volume delimited externally by a cylindrical casing 20 made of magnetic material, and internally by a cylindrical sleeve tube 22 made of nonmagnetic material, seals providing sealing between the sleeve tube 22 and each of the pole pieces 12 and 14.

Thus assembled, the pole pieces 12 and 14 define a common internal bore 24 in which there slides a magnetic body 26, which will be described in more detail hereafter, and which is subjected to the magnetic flux flowing in the pole pieces 12 and 14 and in the casing 20 so as to form a practically closed magnetic circuit.

The pole piece 14 is shaped so that the solenoid valve 100 has operation of the proportional type. More precisely, it is known that the coil of solenoid valves of this type exhibits the essential characteristic of being capable of supplying a substantially constant load for a given current in an appreciable range of displacement of the magnetic body 26, of the order of several millimeters. This characteristic is put to good use in the present invention in order to provide the desired function of modulating the pressure by modulating the electrical current flowing through the coil 10.

A solenoid valve of this type therefore exhibits the advantage of being able to be commanded simply by varying the current flowing through the coil without causing the movable part to beat, and without giving rise to abrupt changes of pressure in the pressure receivers. What is more, such a solenoid valve may easily be commanded by a microprocessor which, for example, chops a direct current at variable frequency, or at fixed frequency and with a variable duty cycle.

The magnetic body 26 is, in reality, composite, and made up of the sleeve tube 28, for example made of mild or very mild steel, in order to constitute the active magnetic part of the magnetic body 26, and surrounding a hollow core 30, for example made of cast iron or of treated steel. The sleeve tube 28 and the core 30 are integral with each other, for example by being force-fitted or sweated together. The core 30 is itself formed with an axial bore 32 so as to slide over a central spindle 34.

A first end 36 of the central spindle 34 is immobilized in leaktight fashion in the flange 16, while the other end 38 is received, also in leaktight fashion, in the pole piece 14. In order to facilitate the production of the solenoid valve, the flange 16 and the pole piece 14 may both be formed with a bore 32a and 32b respectively, with the same axis and the same diameter as the bore 32.

The core 30 is formed, at its end pointing towards the flange 16, with a radial extension 40 situated at a distance from the corresponding face of the sleeve tube 28 and pierced axially with a tapered bore in order to form within the body 26 a housing 42 for a ball 44, held captive in this housing but provided with a certain freedom of axial movement in this housing 42.

The core 30, and therefore the body 26, is urged towards the pole piece 12 and the flange 16 by a compression spring 46 bearing on a collar or circlips 48 integral with the central spindle 34, towards a position of rest in which the ball 44 comes into abutment on a piece 50 which is sweated or force-fitted into the pole piece 12 and provided with an axial passage 52. In this position of rest, the ball 44 therefore closes off the passage 52 between the inside of the bore 24 and the space 19, and therefore forms a ball valve in order to permit or prevent communication with the reservoir 400.

In order to ensure the axial alignment of the ball 44 and of its seat 50, and thus guarantee their perfect axial interaction, the body 26 is immobilized in terms of rotation about the central spindle 34 by at least one (two in the embodiment represented) needle 54 located in a blind bore 56 of the pole piece 12, and received with almost leaktight sliding in a bore 58 of the body 26, formed for example in the core 30. In order to take account of the manufacturing tolerances of the various components and of the slight errors in alignment which may result therefrom, provision may be made for the pin 54 to have a slight radial play in the bore 56.

The sleeve tube 28 is equipped with an axial passage 60 in order to place the spaces 62 and 64 situated on either side of the body 26 in the bore 24 in permanent communication.

The central spindle 34 is equipped with two blind axial drillings 66 and 68 each opening out into a radial drilling 70 and 72 respectively of the central spindle 34, a third radial drilling 74 being formed in the spindle 34 in order to communicate with the axial drilling 68, which moreover opens out into the bore 32b. Each radial drilling 70, 72 and 74 opens out diametrically into a circular groove 70a, 72a and 74a respectively, formed on the outside surface of the central spindle 34.

The core 30 includes radial drillings 80, 82 and 84. The drillings 80 and 82 open out into a circular groove 78 formed on the outside surface of the core 30, at least as many drillings 80 being made as there are pins 54 so that the axial bore or bores 58 open out into this or these radial drillings 80. Axial drillings 76 open out into the radial drillings 84 and place them in communication with the space 64 in the bore 24.

A spring box device, noted overall by the reference 85, is located on the central spindle 34, and includes a spring 88 which is preloaded between, on the one hand, a spring plate 90 in abutment, at rest, on the collar 48 and, on the other hand, a shoulder 92 of the pole piece 14 between the bores 32b and 24 of the latter, so that an axial distance D is left at rest between the facing ends of the spring plate 90 and of the magnetic body 26.

Finally, the flange 16 includes a passage 94 so as to be able to make the space 19 communicate with the reservoir 400 of fluid under low pressure, and a passage 96 so as to be able to make the axial drilling 66 communicate with the generator 300 of pressurized fluid, and the flange 18 includes a passage 98 so as to be able to make the axial drilling 68 and the inside of the bore 32b communicate with the pressure receiver 200.

The solenoid valve whose structure has just been described operates in the following manner.

At rest, that is to say in the absence of electric current flowing through the coil 10, the various elements making up the solenoid valve occupy the position represented in FIG. 1. In particular, under the action of the spring 46 bearing on the body 26, the latter keeps the ball bearing on its seat 50 and prevents the communication between the space 62 and the passage 94 towards the pressure receiver 400.

The pressurized fluid provided by the generator 300 arrives at the pressure receiver 200, a brake motor in the preferred application of the invention, via the passage 96, the drillings 66, 70 and 80, the groove 78, the drillings 82, 72 and 68 and the passage 98, in order to brake the vehicle.

When the computer, by means of sensors (not represented) for sensing the speed of rotation of the wheels, detects imminent locking of the wheel associated with the brake motor 200, it therefore commands the increase in current in the coil 10. This current, by means of the pole pieces 12 and 14, generates a force on the magnetic body 26 which moves counter to the action of the spring 46 whose preload at rest may be quite low, but sufficient, however, to guarantee closure of the valve passage 44–50.

The magnetic body therefore moves by a distance D until it comes to bear on the spring box 85, which then exhibits resistance to advancement which is equal to the preload $F_0$ at rest of the spring 88. The displacement of the magnetic body 26 is further eased by the presence of the passage 60 between the spaces 62 and 64, ensuring equality of the pressures on either side of the magnetic body 26 in all its positions and all its operating phases.

At the very start of this displacement of the magnetic body, the ball 44 is lifted off its seat 50, thus placing the reservoir 400 of fluid under low pressure in communication with the spaces 62 and 64 joined together by the passage 60.

The distance D is predetermined so that it corresponds substantially to one of the limits of the range of displacement of the magnetic body 26, mentioned earlier, and for which the operation of the solenoid valve is of the proportional type. In other words, the characteristics of the coil 10 are predetermined so that at this instant in the operation, the intensity $I_0$ of the current flowing through the coil 10 generates on the magnetic body 26 a force $\Phi_0$ which is equal to and in the opposite direction from the force $F_0$. For any value I of intensity of the current greater than $I_0$, the magnetic body 26 will be subjected to a force $\Phi$ which is proportional to the quantity $(I-I_0)$.

The magnetic body 26 will then be able to compress the spring box 85 by an amount d, having to overcome a resistive load F, greater than $F_0$, and proportional to the value d of the compression of the spring box 85. The stiffness of the spring 88 will therefore be predetermined in order to balance the forces F and $\Phi$ on the magnetic body and thus obtain optimum operation of the solenoid valve.

Under these conditions, with the intensity of the current increasing in the coil 10, the magnetic body 26 moves, compressing the spring box 85, so that the communication between the drilling 80 and the groove 70a is interrupted, as is the supply of pressurized fluid to the brake motor 200 by the generator 300.

With the intensity of the current further increasing, an additional displacement of the magnetic body brings the drilling 84 into communication with the groove 74a. The brake motor 200 therefore finds itself in communication with the reservoir 400 of fluid under low pressure via the drilling 76, the space 64, the passage 60, the space 62 and the valve passage 44–50 which is then open.

The pressure in the brake motor 200 can then decrease, which causes the risk of the wheel associated with the brake motor 200 locking to disappear.

What is more, the groove 72a of the central spindle 34 is dimensioned so that, in all the positions of the magnetic body 26, it communicates with the drilling 82. As a result, the drilling 80 is in permanent communication with the brake motor 200 via the groove 78, the drillings 82, 72 and 68, and the passage 98. The pressure which is exerted in the bore 58 on the transverse section of the pin 54 is therefore permanently equal to the pressure prevailing in the brake motor 200. The drilling 80 therefore constitutes a hydraulic reaction chamber, in interaction with the pin 54, sliding in almost leaktight fashion in its bore 58.

The effect of this is that the movement of the magnetic body 26, produced by the current in the coil 10, is favoured by the hydraulic reaction in the reaction chamber 80 which creates a force which adds to that which is created by the coil 10 and opposite the one exerted by the spring box 85.

When the intensity of the current increases, the pressure in the brake motor decreases. As a result, the hydraulic reaction force due to the reaction chamber 80 also decreases until, added to the action due to the coil 10, it balances the action of the spring 88.

When the computer, in this phase of operation of the antilock system, detects that the wheel associated with the brake motor 200 has acquired too great a speed of rotation, it commands a decrease in the current flowing through the coil 10. The force Φ then becomes less than the force F, so that the action of the spring box becomes preponderant and pushes the magnetic body 26 back towards its initial position of rest.

In this movement, the communication between the drilling 84 and the groove 74a is firstly interrupted, as is the communication of the brake motor 200 with the reservoir 400. Then, with the intensity of the current further decreasing, an additional displacement of the magnetic body brings the drilling 80 into communication with the groove 70a. The generator 300 then finds itself again in communication with the brake motor 200, so that the pressure in the latter increases again.

The pressure in the reaction chamber 80 also increases, so that the hydraulic reaction force due to the reaction chamber 80 increases, opposing the action of the spring box 85, adding to the action due to the coil 10.

The process which has just been described is reproduced if the tendency of the wheel to locking persists, this being so until the vehicle is brought to rest or until the driver of the vehicle has ceased the braking action. The computer then interrupts the excitation of the coil 10, so that the magnetic body 26 returns to its initial position of rest, being urged firstly by the spring box 85, then by the spring 46, until the sleeve tube 28 comes and places the ball 44 in abutment on its seat 50.

It can thus be understood that by suitably modulating the intensity of the current flowing in the coil 10, the magnetic body 26 assumes a position which is a function of the pressure prevailing in the reaction chamber 80, and therefore in the brake motor 200. It is thus possible to apply to the brake motor 200 exactly the desired pressure, proportional to the intensity of the current flowing in the coil 10.

It can thus clearly be seen that a solenoid valve has been produced whose overall size is reduced to a large extent by virtue of the arrangement of the fluid-distribution system inside the electromagnetic coil.

This distribution system is made up of the stationary central spindle 34, which itself forms the distributor element of the solenoid valve of the invention, in interaction with a movable sleeve structure formed by the composite magnetic body 26 and composed of the sleeve tube 28 and of the hollow core 30.

This solenoid valve moreover exhibits numerous advantages. Indeed, it has been seen that the flange 16 includes both the passage 94 for connection with the reservoir 400 and the passage 96 for connection with the generator 300. The presence of these two passages in the same flange makes it possible to incorporate into this flange 16 the generator 300 itself, drawing off the fluid that it requires from the reservoir 400, which makes it possible to shorten and simplify the various hydraulic connections.

What is more, the central spindle 34 is stationary and ensures that the pole pieces 12 and 14 and the magnetic body 26 which slides on it are perfectly coaxial. Such a design makes it possible very easily and very accurately to control the functional play or air gaps, such as the radial distance A between the outside surface of the sleeve tube 28 and the bore 24, and the axial distance B between the inside end of the pole piece 14 and the terminal surface of the magnetic body 26.

FIG. 2 represents an alternative to the solenoid valve which has just been described. In this figure, the elements which are identical or equivalent to those of FIG. 1 are identified by the same reference symbols, sometimes with a "prime" added.

It can be seen in this FIG. 2 that the end flanges have been omitted, the pole pieces 12 and 14 being held, for example, by the cylindrical casing 20' being crimped onto them. The central spindle 34 is therefore immobilized in leaktight fashion in the pole pieces 12 and 14. The solenoid valve thus forms a compact assembly that can, for example, be inserted into a support 15, a snap ring 17 holding the solenoid valve in the support 15. A flat seal 95, formed with suitable openings, may then advantageously be used to provide sealing between the various ducts at the support 15/solenoid valve 100 interface.

Furthermore, the sleeve tube 22, as represented, may be given a shape which complements that of the pole pieces 12 and 14, such a shape allowing the amount of fluid to be decreased and facilitating bleeding operations.

According to this alternative embodiment, the composite magnetic body 26' consists of a sleeve tube 28' able to slide around a hollow core 30'. The sleeve tube 28' at its end pointing toward the pole piece 12 is secured to a support 29 for a cage 42' for a ball 44, and it is immobilized in terms of rotation by a peg 31 secured to the support 29 and penetrating a drilling of the pole piece 12.

The sleeve tube 28' is urged toward the pole piece 12 by a compression spring 46' bearing against the pole piece 14, toward a position of rest in which the ball 44 comes into abutment on the part 50 in order to close off the passage 52.

The pin 54 is stationary with respect to the pole piece 12, and it is accommodated with almost leaktight sliding in the blind bore 58 of the hollow core 30'. It may, as has been represented, simply rest against the pole piece 12. It may equally well be located in a blind bore of the pole piece 12. The spaces on either side of the magnetic body 26' are in permanent communication by virtue of axial grooves 60' made at the external periphery of the sleeve tube 28'.

The operation of the solenoid valve of FIG. 2 is practically identical to that described in relation to FIG. 1.

At rest, the various elements occupy the position represented in FIG. 2. In particular, under the action of the spring 46' bearing against the sleeve tube 28', the latter keeps the ball bearing on its seat and prevents communication with the reservoir 400.

The pressurized fluid supplied by the generator 300 reaches the brake motor 200 via the passage 96, the drillings 66 and 70, the annular groove 78' formed on the internal periphery of the hollow core 30', the drillings 72 and 68 and the passage 98, thus ensuring braking of the vehicle.

When the computer commands the increase in the current in the coil 10, this current generates a force on the sleeve tube 28' which moves counter to the action of the spring 46'.

The sleeve tube 28' therefore moves by the predetermined distance D, as was seen earlier, until it comes to bear on the hollow core 30', which then exhibits resistance to advancement which is equal to the preload $F_0$ at rest of the spring 88' bearing against the pole piece 14. The distance D is formed between the facing parts of the hollow core 30' and of the sleeve tube 28', for example between a radial shoulder 30a of the hollow core 30' and radial tabs 28a of the sleeve tube 28'.

At the very start of this displacement of the sleeve tube 28', the ball 44 is lifted off its seat 50, thus placing the reservoir 400 of fluid under low pressure in communication with the spaces situated on either side of the magnetic body 26'.

The hollow core 30' therefore moves, compressing the spring 88', so that the communication between the drilling 70 and the groove 78' is interrupted, as is the supply of pressurized fluid to the brake motor 200 by the generator 300.

With the intensity of the current further increasing, an additional displacement of the hollow core 30' brings the annular groove 78' into communication with a flat 79 formed on the external periphery of the central spindle 34. The brake motor 200 therefore finds itself placed in communication with the reservoir 400 of fluid under low pressure via the drillings 68 and 72, the groove 78', the space between the flat 79 and the internal surface of the hollow core 30', the space 64, the grooves 60' and the valve passage 44–50 which is then open. The pressure in the brake motor 200 can then decrease.

A stop limiting the movement of the hollow core 30' toward the pole piece 14 may advantageously be formed on the central spindle 34, using a snap ring or circlip 35, in order to prevent the hollow core from traveling past the flat 79 and closing up the communication with the reservoir 400.

As in the previous embodiment, the groove 78' of the hollow core 30' is dimensioned so that in all positions of this hollow core, the groove communicates with the drilling 72, so that the bore 58 is always in communication with the brake motor 200 via the groove 78' and the drillings 72 and 68. The pressure exerted in the bore 58 on the cross section of the pin 54 is therefore always equal to the pressure prevailing in the brake motor 200. The bore 58 therefore constitutes a hydraulic reaction chamber, interacting with the pin 54, sliding in almost leaktight fashion in this bore 58.

As was seen earlier, when the intensity of the current increases, the pressure in the brake motor decreases. As a result, the hydraulic reaction force due to the reaction chamber 58 also decreases until, added to the action due to the coil 10, it balances the action of the spring 88.

When the computer commands a decrease in the current flowing through the coil 10, the force Φ becomes less than the force F so that the action of the spring 88' becomes preponderant and pushes the hollow core 30' and the magnetic body 28' against which it is resting back toward their initial position of rest.

In this movement, the communication between the flat 79 and the groove 78' is firstly interrupted, as is the communication of the brake motor 200 with the reservoir 400. Then, with the intensity of the current further decreasing, an additional displacement of the hollow core 30' brings the groove 78' into communication with the drilling 70. The generator 300 then finds itself in communication again with the brake motor 200, so that the pressure in the latter increases again.

The pressure in the reaction chamber 58 also increases, so that the hydraulic reaction force due to the reaction chamber 58 increases, opposing the action of the spring 88', adding to the action due to the coil 10.

When the computer interrupts the excitation of the coil 10, the magnetic body 26' returns to its initial position of rest, the hollow core 30' firstly being urged by the spring 88' until it comes into abutment on the pole piece 12 via tabs 37, then the sleeve tube 28' being urged by the spring 46' until it comes and places the ball 44 in abutment on its seat 50.

As was seen earlier, by modulating the intensity of the current flowing in the coil 10, the hollow core 30' assumes a position which is a function of the pressure prevailing in the reaction chamber 58, and therefore in the brake motor 200. It is thus possible to apply to the brake motor 200 exactly the desired pressure, proportional to the intensity of the current flowing in the coil 10.

Here again, a solenoid valve has indeed been produced whose overall size is reduced to a large extent by virtue of the arrangement of the fluid-distribution system inside the electromagnetic coil, the distribution system being made up of the stationary central spindle 34 which itself forms the distributor element of the solenoid valve of the invention, in interaction with a movable sleeve tube structure formed by the composite magnetic body 26' and composed of the sleeve tube 28' and of the hollow core 30'.

This solenoid valve exhibits the same advantages as the solenoid valve of FIG. 1 as regards the simplification of the hydraulic connections and the control over the operating air gaps or play. Furthermore, it may easily be slipped into the support 15, which also simplifies the initial installation and maintenance operations. Such a design may of course be applied to the solenoid valve of FIG. 1.

Of course, the invention is not limited to the embodiment which has been described, but can in contrast receive numerous modifications which will be obvious to the person skilled in the art and which fall within the context of the appended claims.

We claim:

1. A pressure-regulating solenoid valve for a hydraulic circuit comprising:

at least one generator of pressurized fluid;

a pressure receiver;

a reservoir of fluid under low pressure;

an electrical coil interacting with two pole pieces;

sleeve means having a magnetic body which moves under the effect of an actuating force generated by a magnetic field created by said electrical coil; and a distributor element retained in a stationary position and interacting with said sleeve means in order to command communication between a first duct connected to said pressure receiver and one of a second duct connected to said generator of pressurized fluid or a third duct connected to said reservoir of fluid under low pressure, said solenoid valve including at least one reaction chamber permanently in communication with said pressure receiver to permanently receive a pressure prevailing in said pressure receiver, said pressure in said reaction chamber acting on said magnetic body to create a reaction force which is counter to a force generated by a preloaded elastic means acting on and urging said movable magnetic body toward a rest position where said reaction chamber is in communication with said reservoir, said reaction force being added to an actuating force generated by said electrical coil to control communication of said pressurized fluid to said pressure receiver.

2. The pressure-regulating solenoid valve according to claim 1, characterized in that said sleeve means includes a sleeve tube integral with a hollow core, said sleeve tube constituting an active magnetic part of said magnetic body.

3. The pressure-regulating solenoid valve according to claim 1, characterized in that said sleeve means includes a housing holding captive a ball interacting with a seat formed on a pole piece in order to control the communication of fluid between said solenoid valve and said reservoir.

4. The pressure-regulating solenoid valve according to claim 3, characterized in that said reaction chamber is formed in said sleeve structure.

5. The pressure-regulating solenoid valve according to claim 4, characterized in that said reaction chamber is delimited by a radial drilling in the hollow core and by the transverse section of a pin sliding in an axial bore of said sleeve structure and received in an axial bore of one of said two pole pieces.

6. The pressure-regulating solenoid valve according to claim 1, characterized in that said preloaded elastic means is formed by a spring box.

7. The pressure-regulating solenoid valve according to claim 6, characterized in that said spring box includes a spring which is preloaded between one of said two pole pieces and a spring plate bearing on said distributor element.

8. The pressure-regulating solenoid valve according to claim 7, characterized in that, when said solenoid valve is at rest, a gap is created between an end on said spring plate and adjacent end on said sleeve means.

9. The pressure-regulating solenoid valve according to claim 1, characterized in that said sleeve means includes a sleeve tube capable of sliding around a hollow core, said sleeve tube constituting an active magnetic part of said magnetic body.

10. The pressure-regulating solenoid valve according to claim 9, characterized in that said preloaded elastic means is formed of a spring which is preloaded between one of said two pole pieces and said hollow core.

11. The pressure-regulating solenoid valve according to claim 9, characterized in that said sleeve tube is integral with a cage surrounding a ball, said ball interacting with a seat formed on one of said two pole piece in order to control the communication between said solenoid valve and said reservoir.

12. The pressure-regulating solenoid valve according to claim 11, characterized in that said reaction chamber is formed in the hollow core.

13. The pressure-regulating solenoid valve according to claim 12, characterized in that said reaction chamber is delimited by an axial bore in said hollow core and by a transverse section of a pin sliding in said axial bore and stationary with respect to one of said two pole pieces.

14. The pressure-regulating solenoid valve according to claim 13, characterized in that, when said solenoid valve is at rest, a gap exist between an end of said sleeve tube and an end of said hollow core.

15. The pressure-regulating solenoid valve according to claim 1, characterized in that said two pole pieces are held between two flanges, a first of said two flanges has a first passage connected with said pressure receiver while a second of said two flanges has a second passage connected with said reservoir of fluid under low pressure and a third passage connected with said generator of pressurized fluid.

16. The pressure-regulating solenoid valve according to claim 1, characterized in that said two pole pieces are held by a casing made of magnetic material.

17. The pressure-regulating solenoid valve according to claim 1, characterized in that said solenoid valve is inserted into a support and held in support by a snap ring.

18. The pressure-regulating solenoid valve according to claim 17, characterized in that a flat seal is placed between said support and said solenoid valve.

19. A pressure-regulating solenoid valve for a hydraulic circuit comprising:

at least one generator of pressurized fluid;

a pressure receiver;

a reservoir of fluid under low pressure;

an electrical coil interacting with first and second pole pieces;

sleeve means having a magnetic body which moves under the effect of an actuating force generated by a magnetic field created by said electrical coil and a housing for holding captive a ball interacting with a seat formed on one of said first and second pole pieces in order to control the communication of fluid between said solenoid valve and said reservoir; and a distributor element retained in a stationary position and interacting with said sleeve means in order to command communication between a first duct connected to said pressure receiver and one of a second duct connected to said generator of pressurized fluid or a third duct connected to said reservoir of fluid under low pressure, said solenoid valve including at least one reaction chamber permanently in communication with said pressure receiver to receive a pressure prevailing in said pressure receiver, said pressure in said reaction chamber acting on said magnetic body to create a reaction force which is counter to a force generated by a preloaded elastic means acting on and urging said movable magnetic body toward a rest position where said ball seats on said seat to prevent communication between said reaction chamber and said reservoir, said reaction force being added to an actuating force generated by said electrical coil to control communication of said pressurized fluid to said pressure receiver.

20. A pressure-regulating solenoid valve for a hydraulic circuit comprising:

at least one generator of pressurized fluid;

a pressure receiver;

a reservoir of fluid under low pressure;

an electrical coil interacting with two pole pieces;

sleeve means having a magnetic body which moves under the effect of an actuating force generated by a magnetic field created by said electrical coil, said sleeve means having a sleeve tube capable of sliding around a hollow core, said sleeve tube constituting an active magnetic part of said magnetic body, said sleeve tube being integral with a cage which surrounds a ball, said ball interacting with a seat formed on one of said two pole piece in order to control the communication between said solenoid valve and said reservoir; and a distributor element retained in a stationary position and interacting with said sleeve means in order to command communication between a first duct connected to said pressure receiver and one of a second duct connected to said generator of pressurized fluid or a third duct connected to said reservoir of fluid under low pressure, said solenoid valve including at least one reaction chamber permanently in communication with said pressure receiver to receive a pressure prevailing in said pressure receiver, said pressure in said reaction chamber acting on said magnetic body to create a reaction force which is counter to a force generated by a preloaded elastic means acting on and urging said movable magnetic body toward a rest position where said ball seats on said seat to prevent communication between said reaction chamber and said reservoir, said reaction force being added to an actuating force generated by said electrical coil to control communication of said pressurized fluid to said pressure receiver.

* * * * *